Nov. 22, 1949  E. A. STALKER  2,488,991
BOUNDARY LAYER CONTROL FOR DRAG REDUCTION
Filed June 25, 1943

INVENTOR
Edward A. Stalker
By Marechal and Biebel
ATTORNEYS

Patented Nov. 22, 1949

2,488,991

UNITED STATES PATENT OFFICE 2,488,991

BOUNDARY LAYER CONTROL FOR DRAG REDUCTION

Edward A. Stalker, Bay City, Mich.

Application June 25, 1943, Serial No. 492,290

13 Claims. (Cl. 244—40)

My invention relates to aircraft and more particularly to an aircraft wing and power plant having reduced drag.

It has for its object first to provide a simple, effective, and economical means of reducing the profile drag of a wing whose airfoil section has its maximum thickness ordinate in the conventional forward location; and second to provide in cooperation therewith a means of reducing the drag of the power plant. Other objects and advantages will appear from the description and drawings.

The above objects are accomplished by the means illustrated in the accompanying drawings in which—

It has been found possible to maintain a laminar flow on the forward section of the wing even when the wing section has its maximum thickness forward of the mid-point of the chord through the provision of a suction slot or slots, properly located and exercising a proper suction effect. Such laminar flow is desirable in obtaining reduced drag since it avoids the occurrence of a high velocity gradient near the surface of the wing. The frictional drag, as is well known, is directly proportional to the velocity gradient. With turbulent flow very small particles of high velocity from the outer boundary of the layer are brought close to the wing surface. Their higher velocity raises the local layer velocity closer to the surface and therefore increases the value of the velocity gradient. The drag is therefore increased.

The boundary layer becomes turbulent if the particles close to the surface are allowed to lag too much behind the particles further out from the surface. Suction from a suction slot properly placed will eliminate the tendency for the lag to accumulate. The suction at the slot increases the velocity of the flow ahead of the slot and retards the flow aft of the slot. Corresponding to a reduction in velocity aft of the slot there is an increase in static pressure or what is the same thing, a reduction in the suction. Hence the slot acts to reduce the suction aft of it and therefore performs the useful function of bringing the low pressure above the wing back to atmospheric pressure. This must always be accomplished in any wing before the trailing edge is reached.

By placing a second slot aft of the first the pressure gradient is kept favorable although the average suction value drops very greatly below the values ahead of the first slot. Hence it is possible by the slot arrangement to effect a reduction in the suction above the wing as the air proceeds to the trailing edge but in the same instance maintain a favorable pressure relationship for low drag. This is accomplished in a number of steps or stages as shown, the number being increased or decreased with the size of the wing.

Figure 1:
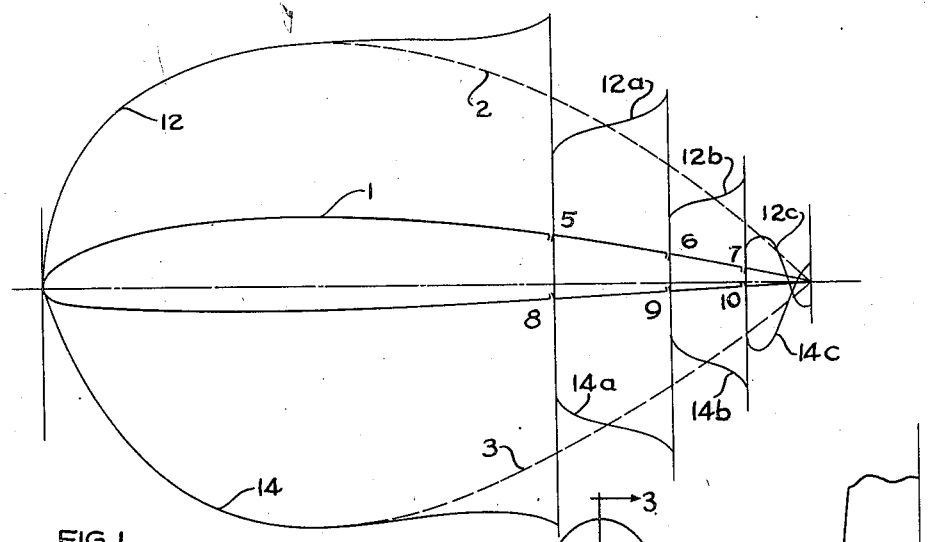
Fig. 1 is a diagrammatic view showing the pressure curve existing on the upper and lower surfaces of a wing constructed in accordance with the present invention.
Figure 2:
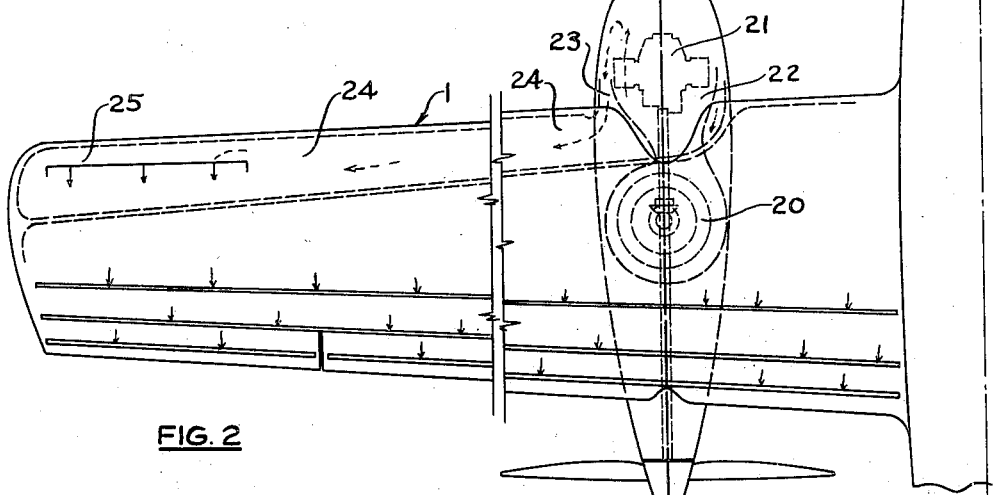
Fig. 2 is a fragmentary plan view of the aircraft.
Figure 3:
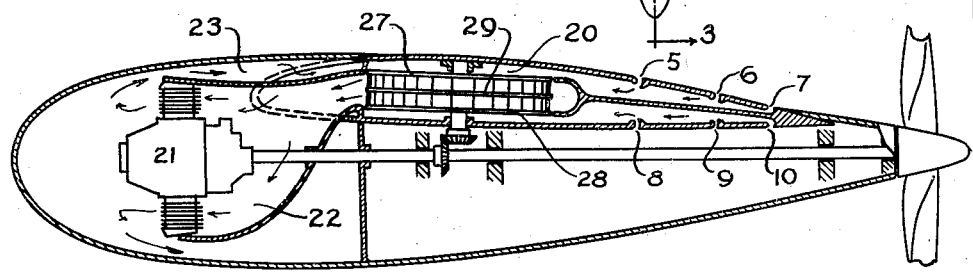
Fig. 3 is a section along line 3—3 in Fig. 2.

Fig. 1 shows a conventional airfoil section in which the wing 1 is relatively thin and with its point of maximum thickness located forward of the mid-point at approximately 33% of the chord length.

The normal pressure distribution curve for both upper and lower surfaces of such a wing without the use of slots is shown by the dashed lines 2 and 3, respectively. Negative pressure or suction is plotted as ordinates and each negative pressure curve is placed on the same side of the horizontal axis as the surface of the wing to which it relates. While both curves are similar in shape, curve 2 includes a greater area than curve 3 and thus corresponds to a net upward suction or lift. It will be noted that the portions of both curves aft of the maximum values and forward of the mid-point, drop sharply and over the major part of the surface have a pressure gradient which is adverse with regard to maintaining a laminar flow over the wing surfaces. The normal tendency is thus to retard the rearward flow of the boundary layer throughout the entire extent of the wing rearward of the point of maximum thickness, thereby creating substantial drag.

Fig. 1 also shows the wing provided with three slots 5, 6 and 7, located in predetermined position in the upper wing surface and three slots 8, 9 and 10 located in corresponding relation in the lower wing surface, in accordance with the present invention. When these slots are properly located, pressure distribution curves are obtained as shown by the segmented solid lines 12, 12a, 12b and 12c on the upper surface and by similar lines 14, 14a, 14b and 14c on the lower surface.

It will be noted that the suction from slot 5 has somewhat increased the suction immediately in advance thereof, and has materially lowered the suction rearwardly thereof. Thus the pressure gradient 12 remains favorable, and drag on the fore part of the wing is lowered by slot 5. Slots 6 and 7 produce similar effects on the pressure conditions existing between the slots, and as a result the gradients 12a and 12b are made either entirely favorable or are so modified as not to be primarily unfavorable, as was the case with curve 2. Similar conditions are established on the lower wing surface by slots 8, 9 and 10.

Because there is no means of increasing the suction aft of the last slot the pressure gradient here becomes unfavorable. It is not practicable to locate the last slot exactly at the trailing edge because too much air would be inducted from behind and below the wing. There would also be structural difficulties. However the last slot should be located close to the trailing edge and preferably in the rear 15% of the chord.

The invention is concerned with a wing having a suitable airfoil section for high speed flight—that is, for low drag. To achieve low resistance by controlling the boundary layer with slots an airfoil section must be adapted to their use. For instance, the section should be doubly convex so that there is a large region of suction on both sides of the airfoil such as shown in Fig. 1. The suction over the upper surface is greater than over the lower surface so that there is a net lift upward.

The value of the mean camber line maximum ordinate is also small being preferably about 3% of the chord subtending the mean camber arc. An upper limit would be about 9%. It must be small in order to preserve the negative pressure (suction) below the wing.

The major forward portion of the lower surface should have substantial curvature and the rear portion should be free of reversals of curvature. A curved surface tends to stabilize the boundary layer preventing it from becoming turbulent. It is much better in this respect than a flat surface and a concave surface actually has a destabilizing effect.

The provision of slots as described is most satisfactory for relatively thin wings. If the wing is thick the pressure distribution curve without slots is steep along the aft portion and it becomes difficult for the suction from the rear slot to change sufficiently the shape of the pressure distribution curve between slots. The preferred thicknesses lie between 10% and 20% of the chord length. Above 20% the drag reduction becomes rapidly smaller.

The slots should extend along a major portion of the wing on each side of the fuselage or center of the aircraft—in other words along a major portion of the semi-span of the wing so as to be effective in reducing the drag of a significant portion of the wing.

Suitable means are provided for producing the desired suction effect at the several surface slots. Such means comprises the blower 20 which inducts air through the slots in the upper and lower surfaces and passes it about the engine 21 by means of duct 22 which encompasses the engine. The air returns to the wing through the passages 23 which lead into the spanwise duct 24 and is discharged from the slot 25 near the wing tip or is otherwise suitably disposed of. Air is also supplied to the engine for combustion and is discharged through the engine's exhaust pipe (not shown).

The blower has two inlets 27 and 28 and a partition 29 which forms a barrier between the upper and lower halves of the blower. The upper inlet serves the slots 5, 6 and 7 while the lower inlet serves the lower slots 8, 9 and 10. The partition 29 segregates the flows within the wing leading to the blower inlets.

In order to obtain the minimum drag for a wing I have found that suction slots are superior to discharge slots. It is preferable that the first slot be aft of the mid-point of the chord. This slot should be succeeded by another suction slot at a substantial distance downstream preferably about half-way between the foremost slot and the trailing edge. Still further improvement can be obtained by locating the last slot close to the trailing edge. Furthermore I have found that the sum of the slot widths in the rear half of the wing should be of the order of 0.1% of the chord length. This is the preferred value but the upper limit may reach about 0.4%. Then however the reduction in resistance is becoming very small. The theoretical lower limit of the sum of the widths is zero but a practical limit is about 0.05% of the chord length. The preferred lower number of slots is three which would make the preferred slot width less than 0.033% of the chord length. The upper limit of the width would be about 0.133%.

The amount of suction to be maintained within the wing is preferably of the order of 0.5q where q is the dynamic pressure of the relative wind in lb. per sq. ft. That is $$q = \frac{\rho v^2}{2}$$

where
$\rho$ = mass density of the air in slugs per cu. ft., and
$v$ = velocity of flight in feet per second.

In order adequately to influence the pressure distribution the first slot should bear a relationship to the locality of maximum thickness of the airfoil section. The first slot aft of the maximum thickness ordinate should be within a thrd of the chord length of that ordinate. This places the most rearward position at two-thirds of the chord length from the leading edge for a conventional wing. A preferred location of the foremost slot for this type of wing is 60% of the chord back from the wing nose.

The wing surface of the front portion of the wing, preferably the forward 60% should preferably be free of slots of either the discharge or suction type. Where a discharge slot is necessary it should be confined to a small spanwise extent or located near the trailing edge.

If the suction slot for drag reduction is to influence properly the flow ahead of the slot the forward surface must be smooth and free of features which would disturb the flow or vitiate the suction effect from the slot. For this reason the forward surface should be free of slots which discharge into the regions adjacent the upper and lower surfaces of the forebody. Air discharged into this area will reduce the forward extent to which the suction from the slot can act and therefore require more suction slots in the forebody. There will then be a departure from the optimum condition in which no slots are present in the forebody. In the preferred form of this invention the forebody surface ahead of the ordinate of maximum thickness is a regularly curved surface substantially free of slots. The discovery that where a suction slot is provided aft of the maximum thickness ordinate, such slot exerts or develops a dominant or controlling effect on the boundary layer flow over the entire body surface ahead of that slot, and without requiring additional slots forwardly thereof, is a feature of importance in the obtaining of the low drag results of the present invention.

The wing slots have been illustrated in conjunction with means for utilizing the inducted air for the power plant but it is to be understood that the slot and blower scheme is designed and is effective to reduce the drag of the wings without regard to the use of the air after induction. Where however the inducted air can be used for the power plant it serves two purposes. The engine can then be submerged and a further saving in drag effected because the so-called spoilage drag is eliminated. This is the drag caused by the disturbance of the relative wind by the usual engine nacelle and its gill system of induction.

If the air is not used for a useful purpose after induction all the power required for induction is rightly converted to a drag coefficient and added to the skin friction drag of the wing. The drag arising from stopping the air at the slots, the momentum drag, is also rightly converted to a drag coefficient which should be added to the power and friction drag coefficients. Yet when all three of these drag coefficient components are added, their total is far less than the drag of the wing without slots of the arrangement herein described.

If the inducted air can be used for the power plant so that the power component of the drag coefficient plus the momentum component is equal to or less than the power plant drag coefficient due to its inductance of air in the conventional manner, then the power and momentum components can justly be charged to the power plant and the proper drag of the wing is further reduced.

In order to supply the power plant with inducted air of sufficient quantity the slots can be widened beyond the limits which have been stated, these limits having been stated for the slots when all the drag components are to be charged to the wing alone. When the engine is to be supplied through these slots they should be increased in width preferably progressively rearward, the last slot being the widest. It is also to be noted that the passages within the wing are of expanding cross-section in the direction of flow toward the inlet of the blower so that the velocity of flow within the wing is reduced thereby reducing the losses of energy within the wing. This is an important constructional feature especially when a large volume of air is to be inducted from the rear of the wing for the power plant.

In order to achieve a net gain in drag the amount of air inducted must be very small because the momentum of the air inducted contributes a component of drag. This is so because the air is stopped in being inducted into the wing. The drag component arising from the change in momentum is kept small by locating the first slot well aft of the mid-point of the chord, preferably at 60% of the chord length from the nose. It is found that this rearward location still permits the slot to exert sufficient influence ahead. Then the forward surface is made free of slots and the momentum drag that such slots would ordinarily create is saved.

All the slots are made very narrow using values substantially below those heretofore proposed. For suction slots the literature commonly recommends a width of 2% of the chord. The width use in accordance with the present invention is of the order of 0.05% of the chord and the sum of the widths of all the slots is thus materially less than the width recommended in the literature for a single slot of the suction type.

By the practicing of the invention as herein described, the drag of the wing and power plant combination can be reduced as much as 75%.

It is a feature of this invention that the induction of air for the power plant is through spanwise slots along a major portion of the span in the rear part of the wing and in particular through the rearmost slots.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A wing comprising an airfoil section formed to define a plurality of induction slots on the upper surface of said wing and a plurality of induction slots in the lower surface of the wing, said slots having a continuous extent spanwise of the wing and leading into the wing interior and slots on the same surface of the wing being spaced chordwise of each other, all of said slots being located well aft of the mid-point of the chord, and means to establish a suction within the wing of the order of one-half the dynamic pressure of the relative wind to induce a flow of the inner portion only of the boundary layer air through said slots into the wing interior, the inward flow through a forward slot serving to alter the pressure distribution on the wing surface forwardly of said slot to reduce the drag thereof, the inward flow through the next said slot serving to increase the suction at the rear of the chordwise extent of surface between said forward slot and said next slot to provide a favorable pressure distribution for drag reduction of said chordwise extent of surface, the sum of the widths of said slots being less than 0.4% of the chord length of said wing for each side of the wing.

2. A high-speed, low-drag wing comprising an airfoil section adapted to high speed flight by drag reduction including convex upper and lower contours along the major forward portions of its chord length, said section being formed to define a plurality of spaced, relatively narrow induction slots in the surface thereof, the foremost of said slots being situated substantially aft of the maximum thickness ordinate of the airfoil section to provide a favorable pressure gradient for laminar flow, the wing surface ahead of said foremost slot being substantially smooth and uninterrupted and closed against a flow of air therethrough into the exterior air region adjacent the same side of the wing as said slot thereby preserving said low-drag laminar flow, at least one additional slot located aft of said foremost slot in cooperatively spaced relation therewith to jointly establish a favorable pressure gradient on the portion of said surface between said slots, the sum of the widths of said slots being less than 0.4% of the chord length, and means to induct the inner part only of the boundary layer on said surface through said slots of a thickness limited by the dimensions of said slots.

3. The combination of claim 2 in which the width of said slots increases progressively rearwardly thereof.

4. The combination of claim 2 in which the width of said slots increases progressively rearwardly thereof, and the flow passages within the wing for the inducted air are of expanding cross-section traveling forwardly thereof.

5. In an aircraft of the character described, the combination of a wing having a double convex airfoil section of substantially curved contour along the major forward portion of its chordwise extent, said section being formed to define a plurality of continuously open surface induction slots thereon in the same side surface of the wing, said slots leading into the wing interior, the foremost one of said slots being located aft of the mid-point of the chord, another of said slots being located aft of the said forward slot to increase the suction ordinate above the mean value between said forward slot and the last said slot reducing the average suction above the wing toward atmospheric pressure while maintaining a pressure distribution between slots favorable to low drag of the wing, said rearward located slot being of greater cross section than said forward slot, the sum of the widths of said slots at a chordwise section being less than 0.4% of the chord length of said wing, means to induce a flow of the boundary layer air through said slot into the interior of the wing to reduce the drag-producing effect of the flow ahead of each said slot and to reduce the suction pressure aft thereof, an engine enclosed within the aircraft, and duct means communicating between said slots and said engine for supplying the air inducted through said continuously open slots to said engine, said duct means being of expanding cross section in the direction of flow providing for delivery of said flow with reduced resistance.

6. A wing comprising an airfoil section formed to define a plurality of induction slots therein in the same side surface of the wing and leading into the wing interior, the foremost of said slots being located aft of the mid-point of the chord, the sum of the widths of said slots aft of said mid-point along a chordwise section being less than 0.4% of the chord length of said wing, said slots being located in cooperatively chordwise spaced relation with respect to each other to jointly establish a favorable chordwise pressure gradient on the portion of said surface between said slots to reduce the drag of the flow thereon and to reduce the suction pressure rearwardly of each said slot, and means to induct the inner part only of the boundary layer through said slots of a limited thickness dependent upon the dimensions of said slots causing a net decrease of wing drag.

7. A wing comprising an airfoil section formed to define a plurality of induction slots in the same side surface of the wing and leading into the wing interior, one of said slots being located aft of the mid-point of the chord, at least one additional slot located aft of said one slot and in cooperative relation therewith to increase the suction ordinates thereover above the mean value between adjacent said slots maintaining a pressure distribution between slots favorable to the development of laminar flow, the last said slot reducing the average suction above the wing toward atmospheric pressure while maintaining a pressure distribution between slots favorable to low drag of the wing, the sum of the widths of said slots being less than 0.4% of the chord length of the wing, and means to induce a flow of the inner part only of the boundary layer air through said slots of a limited thickness controlled by the dimensions of said slots to reduce the drag-producing effect of the flow ahead of said slots and to reduce the suction pressure aft of said slots.

8. A high speed low drag wing comprising an airfoil section formed to define a plurality of spanwise extending induction slots on opposite sides of said wing in the rearward portion thereof, power operated means to induce flows through said slots into the wing interior, said wing having an airfoil section adapting it to high speed flight by drag reduction including a convex upper contour and a convex lower contour and a mean camber maximum ordinate less than about 9% of the section chord length, said slots in each of the upper and lower surfaces being spaced apart chordwise at predetermined limited distances such that the suction effects exerted through the slots cooperate over said surfaces to exclude unfavorable pressure gradients thereon between the respective slots to establish substantially laminar flows thereon, the sum of the widths of said slots along the section chord in each said surface being less than 0.4% of the section chord length with resulting induction into each slot of the inner portion only of the boundary layer forwardly thereof substantially corresponding in thickness with the width of the slot causing a net decrease of wing drag.

9. A high speed low drag wing comprising an airfoil section formed to define a plurality of spanwise extending induction slots on said wing in the rearward portion thereof, said wing having an airfoil section adapting it to high speed flight by drag reduction including a convex upper contour and a convex lower contour, said slots being spaced apart chordwise over the wing surface at predetermined limited distances such that the suction effects exerted through the slots cooperate over said surface to create a favorable chordwise pressure gradient thereon over the major chordwise extent of the surface between the respective slots to establish substantially laminar flows thereon, the sum of the widths of said slots along the section chord being less than 0.4% of the section chord length, and power operated means to induce flows through said slots into the wing interior of less than the entire boundary layer thickness on the wing surface adjacent said slots as limited by the dimensions of said slots causing a net decrease of wing drag.

10. A high speed low drag wing comprising an airfoil section formed to define a plurality of spanwise extending induction slots on said wing in the rearward portion thereof, said wing having an airfoil section adapting it to high speed flight by drag reduction including a convex upper contour and a convex lower contour, said slots being spaced apart chordwise over the wing surface at predetermined limited distances such that the suction effects exerted through the slots cooperate over said surface to create a substantially continuously favorable chordwise pressure gradient thereon between the respective slots to establish substantially laminar flows thereon, the sum of the widths of said slots along the section chord being less than 0.4% of the section chord length, and power operated means to induce flows through said slots into the wing interior of less than the entire boundary layer thickness on the wing surface adjacent said slots as limited by the dimensions of said slots causing a net decrease of wing drag, the widths of successive said slots increasing toward the trailing edge of the wing.

11. A high speed low drag wing comprising an airfoil section formed to define a plurality of induction slots on the same side of the wing, said slots in the wing surface being spaced apart chordwise at predetermined limited distances such that the suction effects exerted through the slots cooperate to create a substantially continuously favorable chordwise pressure gradient on the portions of said surface between the respective slots to establish substantially laminar flows thereon, at least some of said slots having a slot width not substantially more than about 0.13% of the section chord length, and power operated blower means to induce flows through said slots into the wing interior of less than the entire boundary layer thickness on the wing surface adjacent said slots as limited by the dimensions of said slots causing a net decrease of wing drag.

12. A high speed low drag wing comprising an airfoil section formed to define a plurality of induction slots, duct means separately connecting with different said slots, said slots in the wing surface being spaced apart chordwise at predetermined limited distances such that the suction effects exerted through the slots cooperate to exclude an unfavorable chordwise pressure gradient on the portions of said surface between respective slots to establish substantial laminar flows thereon, at least some of said slots having a slot width not substantially more than about 0.13% of the section chord length, and power operated blower means connecting with said duct means to induce flows through said slots into the wing interior of less than the entire boundary layer thickness on the wing surface adjacent said slots as limited by the dimensions of said slots causing a net decrease of wing drag.

13. A high speed low drag wing comprising an airfoil section formed to define a plurality of spanwise extending suction slots on opposite sides of the wing for inducting boundary layer air into the wing, said slots in the same side surface of the wing being spaced apart chordwise at predetermined limited distances such that the suction effects exerted through the slots cooperate over said surfaces to exclude an unfavorable chordwise pressure gradient thereon between the respective slots to establish substantially laminar flows thereon, at least some of said slots having a width not substantially greater than 0.13% of the chord length with resulting induction into each slot of the inner portion only of the boundary layer forwardly thereof substantially corresponding in thickness with the width of the slot causing a net decrease of wing drag.

EDWARD A. STALKER.

REFERENCES CITED

The following references are of record in the file of this patent:

UNITED STATES PATENTS

| Number | Name | Date |
| --- | --- | --- |
| 1,779,160 | Diehl | Oct. 21, 1930 |
| 1,829,616 | Stalker | Oct. 27, 1931 |
| 1,913,644 | Stalker | June 13, 1933 |
| 2,037,942 | Stalker | Apr. 21, 1936 |
| 2,041,786 | Stalker | May 26, 1936 |
| 2,041,793 | Stalker | May 26, 1936 |
| 2,136,403 | Vance et al. | Nov. 15, 1938 |
| 2,187,446 | Busselmeier | Jan. 16, 1940 |
| 2,211,871 | Wagner et al. | Aug. 20, 1940 |
| 2,252,528 | Sikorsky et al. | Aug. 12, 1941 |
| 2,372,301 | Stalker | Mar. 27, 1945 |

FOREIGN PATENTS

| Number | Country | Date |
| --- | --- | --- |
| 222,845 | Great Britain | May 7, 1925 |
| 479,598 | Great Britain | Feb. 7, 1938 |
| 504,747 | Great Britain | May 1, 1939 |
| 584,585 | Germany | Sept. 21, 1933 |
| 597,674 | France | Sept. 7, 1925 |

OTHER REFERENCES

Ser. No. 235,640 Van Den Bussche (A. P. C.), pub. May 25, 1943.

Technical Memo National Advisory Comm. for Aeronautics No. 974, Washington, April 1941, pages 1-5.